United States Patent [19]

McCullough et al.

[11] Patent Number: 4,971,718

[45] Date of Patent: Nov. 20, 1990

[54] ALKANOLAMINE GAS TREATING COMPOSITION AND PROCESS

[75] Inventors: John G. McCullough, Hawthorne, N.Y.; Joseph A. Faucher, Carlsbad, Calif.; Daniel J. Kubek, Croton; Kenneth J. Barr, Yonkers, both of N.Y.

[73] Assignee: UOP, Des Plaines, Ill.

[21] Appl. No.: 223,369

[22] Filed: Jul. 25, 1988

[51] Int. Cl.$^5$ .............................................. C23F 11/00
[52] U.S. Cl. ................................ 252/189; 252/389.54; 252/392
[58] Field of Search ........... 252/403, 400.5, 1, 389.62, 252/392, 189, 389.54, 189

[56] References Cited

U.S. PATENT DOCUMENTS

| | | | |
|---|---|---|---|
| 3,535,260 | 10/1970 | Singh | 252/189 |
| 3,808,140 | 4/1974 | Mago et al. | 252/389 R |
| 3,896,044 | 6/1975 | Mago et al. | 252/192 |
| 3,923,954 | 12/1975 | Petrey, Jr. et al. | 252/192 |
| 3,951,844 | 4/1976 | Mago | 252/192 |
| 3,959,170 | 5/1976 | Mago et al. | 252/189 |
| 4,100,100 | 7/1978 | Clouse et al. | 252/189 |
| 4,372,843 | 2/1983 | Niek | 252/389.54 |
| 4,431,563 | 2/1984 | Krawczyk et al. | 252/389 |
| 4,502,979 | 3/1985 | McCullough et al. | 252/389.1 |

*Primary Examiner*—Robert L. Stoll
*Assistant Examiner*—Valerie Fee
*Attorney, Agent, or Firm*—Thomas K. McBride; John G. Tolomei; Warren K. Volles

[57] ABSTRACT

A novel alkanolamine gas treating composition and method for purifying a gas stream containing acid gas impurities. The composition consists essentially of an alkanolamine solvent in an aqueous solution with antimony wherein said alkanolamine solvent includes at least about 1% by weight of methydiethanolamine (MDEA) and at least about 5% monoethanolamine (MEA) by weight of the total solution, and with said antimony present in a concentration of at least about 100 ppm. The combination of antimony and MDEA inhibits corrosion and retards solvent degradation.

7 Claims, No Drawings

ALKANOLAMINE GAS TREATING COMPOSITION AND PROCESS

This invention relates to a novel alkanolamine gas treating composition and to an improved process for purifying a gas stream with a stabilized monoethanolamine solvent solution.

BACKGROUND OF THE INVENTION

Gases such as natural gas, flue gas and synthesis gas have been purified by the utilization of aqueous alkanolamine solutions for the adsorption of acid gases such as $CO_2$, $H_2S$ and COS contained in the gas stream. The alkanolamine solution (e.g., a monoethanolamine or diethanolamine aqueous solution) flows counter current to the gas stream in an absorption column in order to remove the acid gases. An advantage of such a system is that the process is a continuous cyclic one and the reaction can thus be reversed at higher temperatures in order to regenerate the alkanolamine from the rich solution.

When steel parts or components are used in such a system, it has been found that both general and local corrosive attack can occur. This is a particular problem in reboilers and heat exchangers where the steel is exposed to a hot, protonated alkanolamine solution. A heat transferring metal surface appears to be especially vulnerable. Previous investigation by others have revealed that under certain conditions corrosive products such as aminoacetic, glycolic, oxalic and formic acids were formed. The monoethanolamine or diethanolamine salts of these acids present the possibility of increased attack upon ferrous metals. Furthermore, the carbonate salt of monoethanolamine can be converted to additional products such as N(2-hydroxyethyl) ethylenediamine which has been found to increase corrosivity towards steel, particularly under heat transfer conditions.

The use of corrosion inhibitors to inhibit corrosion of metallic surfaces in contact with aqueous alkanolamine solutions is well known. In U.S. Pat. No. 3,808,140 a corrosion inhibiting composition is taught based on the synergy of using a combination of antimony compounds and vanadium compounds. The patent also acknowledges the independent use of antimony compounds and vanadates separate from their combination.

Another problem in the use of monoethanolamine for gas treatment relates to its instability in solution with time. Degraded monoethanolamine has to be replaced frequently with the attendant cost of fresh monoethanolamine solutions and the time lost by the shutdown of the absorption regeneration process.

To combat degradation, trialkanolamines, such as triethanolamine, triisopropanolamine, and triisobutanolamine, are introduced into the monoethanolamine solution, as taught in U S. Pat. No. 3,535,260, which is incorporated herein by reference. The trialkanolamines, however, suffer from the disadvantage of having a much higher boiling point and a higher molecular weight than monoethanolamine thus they cannot be recovered during the regeneration step.

SUMMARY OF THE INVENTION

A novel alkanolamine gas treating composition has been discovered in accordance with the present invention which inhibits corrosion and stabilizes the alkanolamine against degradation consisting essentially of an aqueous alkanolamine solution and at least 100 ppm of antimony with said alkanolamine including at least 1% methyl-diethanolamine by weight and at least 5% monoethanolamine or diethanolamine by weight of the total solution.

The method of the present invention involves the purification of a gas stream containing impurities comprising (i) passing the gas stream through an aqueous solution of stabilized monoethanolamine or diethanolamine in such a manner that the impurities are absorbed into the monoethanolamine or diethanolamine solution to form a rich solution, (ii) regenerating the monoethanolamine or diethanolamine solvent from the rich solution so as to remove the impurities, (iii) recycling the monoethanolamine or diethanolamine solution by feeding it back into contact with the gas stream in a closed loop and (iv) introducing methyldiethanolamine into the recirculating aqueous solvent solution in an amount of from 1 to 25 percent by weight of the total solution. The method is further improved by adding at least 100 ppm of antimony into the solvent solution.

DETAILED DESCRIPTION

The process of using an aqueous solvent solution of monoethanolamine or diethanolamine as an absorbent for impurities in gas streams is conventional. Insofar as monoethanolamine is concerned, the aqueous solution is generally made up of about 15 to about 35 percent by weight of monoethanolamine and about 65 to about 85 percent by weight of water, both percentages based on the total weight of the solution. Higher concentrations of monoethanolamine, i.e., up to about 40 or about 45 percent by weight, prove advantageous when lower solvent temperatures are used. Aqueous solutions of diethanolamine generally contain about 30 to about 55 percent by weight of diethanolamine and about 45 to about 70 percent by weight of water, both percentages based on the total weight of the solution. Higher concentrations of diethanolamine, i.e., up to about 60 or about 65 percent by weight, also, prove more advantageous when corrosion inhibiting additives and lower solvent temperatures are used.

A stabilizer, i.e., a chemical compound which stabilizes the monoethanolamine or diethanolamine against, or inhibits, degradation, is added in an amount of about 1 to about 25 percent by weight of the total solution and preferably between 5 and 20 percent by weight, based on the total weight of the solution. It will be understood by those skilled in the art that amounts of stabilizer up to 35 percent by weight of the total solution and even greater amounts can be added with an increase in stabilizer effect; however, additions of stabilizer of greater than about 25 percent by weight of the total solution are impractical as they tend to radically change the operating conditions of the plant. A typical monoethanolamine solution comprises about 70 percent by weight water and about 30 percent by weight monoethanolamine, based on the weight of the solution.

The formula for the stabilizer of interest here is as follows:

methyldiethanolamine (MDEA)

$CH_3N(CH_2CH_2OH)_2$

The advantageous characteristics of the stabilizer mentioned above is that it is relatively inexpensive, highly soluble in water, and higher boiling than water so that it is, for example, not lost in the stripping step of a cyclic carbon dioxide removal process.

Evidence indicates that this stabilizer functions by the mechanism of peroxide decomposition, i.e., it decomposes organic peroxides and hydroperoxides. This has the effect of interrupting the free radical chain process by which autoxidation of mono and diethanolamine occurs.

Schematically, this can be represented as follows:

Activation $$RH \rightarrow R\cdot + H\cdot \quad (1)$$

Propagation $$R\cdot + O_2 \cdot RO_2 \quad (2)$$

$$RO_2\cdot + RH \rightarrow ROOH + R \quad (3)$$

Decomposition of peroxide $$ROOH \rightarrow RO\cdot + \cdot OH \quad (4)$$

$$2ROOH \rightarrow RO\cdot + RO_2\cdot + H_2O \quad (5)$$

For saturated hydrocarbons, thermal initiation occurs by a reaction such as:

$$RH + O_2 \rightarrow R\cdot + HO_2 \quad (6)$$

Reaction (6), however requires considerably more energy than does reaction (4). Consequently, reaction (4) tends to become the main reaction of initiation even when hydroperoxide concentration is very low.

A peroxide decomposer functions by inducing the destruction of peroxides by either of the following two reactions:

$$Y + ROOH \rightarrow ROH + YO \quad (7)$$

$$Z + ROOH \rightarrow Z + \text{inactive products} \quad (8)$$

Reactions (7) and (8) are not stoichiometeric. The tertiary amine functions more as a catalyst for decomposition as in reaction (8) rather than as a straightforward reducing agent as in reaction (7).

The absorption step is carried out at a temperature in the range of about 40° C. to about 90° C. and at a pressure of about 200 psig to about 800 psig. The regeneration step is carried out at a temperature in the range of about 100° C. to about 115° C. and at a pressure of about 5 psig to about 15 psig.

MDEA also appears to function synergistically when antimony is present for inhibiting the corrosion of mild steel. MDEA apparently increases the solubility of antimony in the alkanolamine solution by as much as an order or magnitude greater than the solubility of antimony in an alkanolamine solution of monoethanolamine (MEA) alone. Thus MDEA in addition to stabilizing the monoethalolamine (MEA) in solution has been found to increase the effectiveness of antimony to reduce the corrosion rate of ferrous metals by a factor of 8 or more.

The preferred antimony compounds used in this invention are: antimonyl compounds, such as, alkali metal antimonyl tartrates, alkali metal antimony gluconates and other such antimony derivatives of polyhydroxy organic acids, wherein the aliphatic carboxylic acid moiety has from about 2 to about 6 carbon atoms. A preferred antimonyl compound is potassium antimonyl tartrate having the formula:

$$KSbOC_4H_4O_6 \cdot \tfrac{1}{2} H_2O$$

as well as sodium antimonyl tartrates. When alkali metal antimonyl tartrates are used in the combination of the instant invention, small amounts of tartaric acid, that is about 1.0 percent to about 50 percent by weight of the antimony compound is preferably employed for improved stability.

Other antimony compounds which can be used in the process of this invention include antimony trioxide or pentoxide reaction products with orthodihydric phenols, sugar alcohols, and similar hydroxy compounds which form definite but complex compounds.

Alkanolamine systems which are benefited by the inclusion of MDEA and antimony compounds are those mono and polyalkanolamines having from 2 to 4 carbon atoms per alkanol moiety. Typical alkanolamines are monoethanolamine, diethanolamine, and monoisopropanolamine.

Equipment used in the absorption/regeneration process is also conventional and typically comprises the following: absorber, regenerator, lean/rich solution heat exchangers, lean solvent cooler, reboilers, overhead condenser, lean solvent pump, reflux water pump, hydraulic turbine, and relux condenser.

The following examples illustrate the stabilizing effect of MDEA in an alkanolamine system and its effect on corrosion inhibition in the presence of antimony. It is found that the stabilizer can be recovered during the regeneration step. Percentages are by weight.

EXAMPLE 1

A. Laboratory air is sparged through a fitted glass tube into a stirred vessel (closed and fitted with a condenser) in which there are 300 milliliters of a solution containing 25 percent monoethanolamine, and 75 percent water (carbonated to saturation with carbon dioxide). The temperature of the solution is maintained at 75° C. The sparging is continued for 8 days.

B. Extent of oxidation is judged semi-quantitatively by determination of the formation of "heat stable salts". (This expression is defined as the reaction of a strong acid with an alkanolamine solvent that does not permit the thermal regeneration of the alkanolamine under regeneration conditions. The strong acid remains bound to the basic alkanolamine and this resulting "salt" product is "heat stable" under regeneration conditions, e.g., the oxidative degradation of alkanolamines forms lower molecular weight carboxylic acids. These acids, in turn, react with unreacted alkanolamine molecules to form heat stable salts.) This is accomplished by titration in methanol to a pH of 11.3 against 0.5 N potassium hydroxide. The formation of heat stable salts is a measure of the bound monoethanolamine in solution, unavailable for carbon dioxide absorption. Under these conditions of aeration, an additional amount of monoethanolamine is lost to miscellaneous degradation products, roughly equal to the quantity determined as heat stable salts.

C. A qualitative judgment of oxidative degradation can also be made by the color apparent on visual inspection. A control solution (with no stabilizer) turns first to yellow, passes to orange, and finally turns to dark red after 4 days of sparging at 75° C. When a successful stabilizer is used at a sufficient concentration level the monoethanolamine solution remains water-white in color, even after 4 days.

D. Organic peroxides in solution are determined by the very sensitive colorimetric test using ferric thiocyanate.

EXAMPLE 2

Example 1A is repeated. At the end of the 8 days, the solution is removed, any water lost is replaced, and a 100 milliliter aliquot is regenerated to drive out residual carbon dioxide. Two determinations are made on the regenerated solution: the first is a titration with standardized hydrochloric acid to find the total alkalinity remaining; the second repeats Example 1B.

There appears to be a linear loss of alkalinity, i.e., destruction of monoethanolamine, amounting to one percent per day. The formation of heat stable salts rises rapidly in the first two days and then rises slowly.

It is concluded from the data that the determination of loss of alkalinity is a more meaningful measure of monoethanolamine oxidation than is the formation of heat stable salts.

EXAMPLE 3

Example 2 is repeated using three and two different solutions, respectively, in runs of 3, 6, and 12 days each. The first solution (1) is a control, i.e., without a stabilizer. The second solution (2) has added to it, 20 percent (based on the weight of the monoethanolamine) of MDEA.

|  | 3 days | 6 days | 12 days |
|---|---|---|---|
| Percent Loss of Alkalinity (approx.) | | | |
| (1) Control | 3 | 6 | 12 |
| (2) MDEA | 1 | 1.2 | 1.5 |
| Percent Formation of heat stable salts (approx.) (based on weight of monoethanolamine) | | | |
| (1) Control | 1.5 | 1.6 | 1.8 |
| (2) MDEA | 0.5 | 0.6 | 0.8 |

EXAMPLE 4

A typical absorption/regeneration process is carried out. Feed gas enters the bottom of a packed or trayed absorber column at a temperature of 120° F. to 170° F. As the gas flows up through the column, it contacts an amine solution, which enters, at the top of the absorber, relatively free of carbon dioxide and at temperature of about 110° F. Carbon dioxide is absorbed from the gas into the amine solution, almost all of the carbon dioxide being removed from the gas stream. The temperature of the solution increases due to the heat of absorption of carbon dioxide, the rich solution, which is loaded with carbon dioxide, discharging from the bottom of the absorber at an elevated temperature.

The rich solution, at the pressure of the feed gas, flows through a bank of lean/rich heat exchangers where its temperature is increased by exchange with hot lean solvent from the base of the stripper. Power often is recovered from the high pressure, rich solvent stream in a hydraulic turbine, which also serves to reduce the pressure of the rich solution before it enters the top of the regenerator.

In the stripper, a portion of the carbon dioxide flashes from the solution due to the reduction in pressure. The remainder of the carbon dioxide is stripped from the solution with heat supplied by steam and/or process gas in the monoethanolamine solution reboiler(s). Carbon dioxide and steam flow out of the regenerator overhead. To maintain water balance, a portion of the steam is condensed and returned to the regenerator as reflux. Hot regenerated lean solution from the base of the stripper is heat exchanged with rich solution, further cooled with air or cooling water in the lean solution cooler, and pumped back to the top of the absorber. A slipstream of cool lean solution is passed through an activated carbon filter.

A 20 million standard cubic feet per day hydrogen/carbon dioxide steam reformed synthesis gas plant is used to carry out this example. A 28 percent by weight solution of monoethanolamine is employed to remove carbon dioxide from a 200 psig gas stream containing 12 percent by volume of carbon dioxide down to a level of 50 ppm (parts per million) carbon dioxide. Over a 5-year period, the heat stable salt content ranges between 1.1 and 1.9 percent by weight and the iron content ranges between 50 and 100 ppm. During this period, several partial solution purges are required to maintain these values.

Following a normal plant turnaround, the unit is commissioned with fresh monoethanolamine and a stabilizer, methyldiethanolamine, is added. Over a 6-month period, the methyldiethanolamine concentration ranges between 4 and 5 percent by weight. During this same period, the heat stable salt content is less than 0.5 percent by weight and the iron content never exceed 4 ppm. In addition, the plant reports that no solution purging is required and solvent makeup is reduced.

EXAMPLE 5

The corrosiveness of amine carbon dioxide solutions was measured both in immersion tests at high pressure, which imitate the absorber of a gas treating unit, and in heat-transfer tests, which imitate the stripper and reboiler.

Immersion corrosion tests were performed in a stainless steel pressure vessel. One or two mild steel coupons were mounted on plastic holders which isolate the coupons electrically from the vessel. The coupons were covered with a solution of monoethanolamine (MEA) or MEA and methyldiethanolamine (MDEA) saturated with carbon dioxide, and were electrically activated. If a blank test was desired, the cell was then closed. If antimony was to be tested, the amine solution was withdrawn and replaced by the desired solution of amines and antimony, previously saturated with carbon dioxide, thus simulating the inhibition of an actively corroding absorber in a gas treating unit. The cell was then closed and heated to the desired temperature. Carbon dioxide was added to or bled from the vessel to achieve the desired pressure. After the desired period, usually three days, the cell was cooled, gas pressure was relieved, the coupons were cleaned and reweighed, and the corrosion rate was calculated from the weight loss.

Heat transfer corrosion tests were performed in a glass cell, with the mild steel test coupon forming the bottom of the cell. A solution of MEA or MEA and MDEA was saturated with carbon dioxide and added to the cell. The coupon was activated by electrochemically reducing the passive film which is always present on mild steel exposed to dry air. The cell was then placed on an electric heater and purged with carbon dioxide for 20 to 30 minutes, while the solution was heated to reflux through the test coupon. Then antimony was added, simulating the inhibition of a hot, actively corroding stripper in a gas treating unit. If a blank test was desired, the antimony was omitted. The solution was boiled through the test coupon for the desired period, usually three days, with continuous purging with carbon dioxide. Then the cell was cooled, the coupon was reweighed, and the corrosion rate was calculated from the weight loss.

The following two tables represent a compilation of results from the corrosion tests:

TABLE I

THREE-DAY IMMERSION CORROSION TESTS UNDER $CO_2$ PRESSURE OF 135 PSIA AT 250° F.

| Composition, weight % amines in total solution | | corrosion w/o Sb | corrosion 300 ppm Sb |
|---|---|---|---|
| 0% MDEA | 30% MEA | 17 mpy | 14 mpy |
| 5% MDEA | 25% MEA | 14 mpy | 5 mpy |
| 10% MDEA | 25% MEA | 16 mpy | 5 mpy |
| 26% MDEA | 13% MEA | 10 mpy | 1 mpy |

TABLE II

THREE-DAY HEAT TRANSFER CORROSION TESTS UNDER $CO_2$ AT ATMOSPHERIC PRESSURE AND REFLUX TEMPERATURE

| composition, weight % amines | | corrosion w/o Sb | corrosion 100–1000 ppm Sb |
|---|---|---|---|
| 0% MDEA | 30% MEA | 10.6 mpy | 13.2 mpy |
| 5% MDEA | 25% MEA | 8 mpy | 2.2 mpy |
| 10% MDEA | 25% MEA | 8.4 mpy | 1.4 mpy |
| 26% MDEA | 13% MEA | 4.7 mpy | 1.5 mpy |

In the tests, antimony was introduced as potassium antimony tartrate with the concentration indicated in parts per million (ppm) elemental antimony. Reading across the first row of data in each table shows that antimony, in the absence of MDEA, has an erratic effect on the corrosion rate. (The corrosion values specified in the tables represent averages of many data points and do not identify absolute data points.) Reading across the other rows show that antimony is an excellent inhibitor in the presence of MDEA. Reading down the third column of each Table, i.e. in the absence of antimony, MDEA appears to have very little or no effect on corrosion but that the corrosion rate appears to be proportional to the concentration of MEA. Reading down the fourth column shows that MDEA markedly reduces corrosion so long as antimony is present.

It also appears that at least about 100 ppm antimony is required to achieve substantial corrosion inhibition in the presence of MDEA, with optimum performance at a minimum level of about 300 ppm. The preferred concentration of MDEA is a minimum of 1% by weight of the total solution, although optimum corrosion inhibition occurs with a minimum concentration of at least 5% of the total alkanolamine solution. The lower concentration of 1% is a practical lower level based upon an anticipated perceptible effect at such level. The concentration of MEA should be at least equal to 5% by weight of the total solution and preferably at least 10% by weight of the total solution. On a molar basis MEA should preferably be the major component.

Accordingly, to stabilize an alkanolamine solution, MDEA should be present in an amount of at least 5% of the total solution. However the combined presence of both MDEA and antimony with antimony present in an amount above about 100 ppm results in both stabilization and corrosion inhibition with the maximum effect occurring with a concentration of MDEA above at least about 5% of the total alkanolamine solution and with antimony present above about 300 ppm.

What is claimed is:

1. An acid gas treating composition consisting essentially of an alkanolamine solvent in an aqueous solution with antimony wherein said alkanolamine solvent includes at least about 5% by weight of methyldiethanolamine (MDEA) and at least about 5% monoethanolamine (MEA) by weight of the total solution, and with said antimony present in a concentration of at least about 100 ppm.

2. An acid gas treating composition as defined in claim 1 wherein said MEA is present at a concentration of from about 15 to 35% by weight of the total solution; and said MDEA is present at a concentration of from about 5 to 25% by weight of the total solution.

3. An acid gas treating composition as defined in claim 2 wherein said antimony concentration is about at least 300 ppm.

4. An acid gas treating composition as defined in claim 3 wherein said antimony is introduced to the solution as potassium antimonyl tartrate.

5. An acid gas treating composition according to claim 1 wherein said alkanolamine solvent includes from about 30 to 65% weight of diethanolamine.

6. An acid gas treating composition essentially of an alkanolamine solvent in an aqueous solution with antimony, wherein said antimony is present in a concentration of from about 100 to 1000 ppm and wherein said alkanolamine solvent includes from about 15 to 35% by weight monoethanolamine and a sufficient concentration of methyldiethanolamine to provide enhanced corrosion protection in combination with said antimony.

7. An acid gas treating composition according to claim 6 wherein the concentration of methyldiethanolamine is from about 5 to 25% by weight of the total solution.

* * * * *